United States Patent
Schacht

[11] 4,023,034
[45] May 10, 1977

[54] LIGHT ADMITTING MEANS FOR PHOTOCELL-CONTROLLED LIGHTING FIXTURE

[76] Inventor: Ezra L. Schacht, P.O. Box 8367, Houston, Tex. 77004

[22] Filed: Sept. 8, 1975

[21] Appl. No.: 611,524

[52] U.S. Cl. .............................. 250/227; 250/239; 350/96 R

[51] Int. Cl.² .......................................... G02B 5/14

[58] Field of Search ......... 250/239, 227; 350/96 R, 350/96 B

[56] References Cited
UNITED STATES PATENTS

| | | | |
|---|---|---|---|
| 3,051,035 | 8/1962 | Root | 250/227 |
| 3,153,172 | 10/1964 | Sun Ling | 250/227 |
| 3,274,392 | 9/1966 | Harling | 250/239 |
| 3,621,269 | 11/1971 | Misencik | 250/239 |
| 3,892,962 | 7/1975 | Whited | 250/227 |

Primary Examiner—David C. Nelms

[57] ABSTRACT

Fixed indoor ceiling-mounted lighting fixtures can be inexpensively and simply dimmed automatically in response to natural daylight availability, by photocell-controlled relay.

An illustration of the technique is shown for modification of a two-ballast four-lamp fluorescent fixture, to reduce consumption of electrical energy by fifty percent when daylight permits.

1 Claim, 3 Drawing Figures

LIGHT ADMITTING MEANS FOR PHOTOCELL-CONTROLLED LIGHTING FIXTURE

BACKGROUND OF THE INVENTION

New United States government recommendations for energy conservation through reduction of lighting levels, as well as escalating costs of electrical energy, make the use of daylight in buildings, when available, highly desirable. A casual inspection of many office buildings will show that lighting fixtures are on while the contributed daylight through the windows makes the use of at least a part of the interior lighting unnecessary.

Common methods of construction today employ suspended ceilings with fluorescent lay-in or troffer-type fixtures supported on such ceilings. Popular fixtures are the four-lamp fluorescent type, usually with two ballast transformers. It is desirable to control at least one of these ballasts and its two lamps by photoelectric response to daylight. Photocell controlled relays are well known in the art, but a relay of this type, installed within the wiring and ballast compartment of a fixture, requires a simple method of access to the daylight upon which its operation depends.

OBJECTS AND SUMMARY OF PREFERRED EMBODIMENTS OF THE INVENTION

Accordingly it is a primary object of the present invention to provide a simple light-admitting method to photocell controlled relays located within the body of the lighting fixture.

It is a further object of the present invention to make the installation so simple that a minimum disturbance to fixture or building structure is required, and that the work required be within the capability of the maintenance personnel now qualified to replace lamps and ballasts.

It is a further object of the present invention to make the installation of such light-admitting means simple for manufacturers of the lighting fixtures.

Other and further objects will become apparent to those skilled in the art, upon consideration of the following detailed description and with reference to the following drawings, wherein like elements have been identified with like numerals, in which:

DESCRIPTION OF PREFERRED EMBODIMENTS OF THE PRESENT INVENTION

Figure 1:
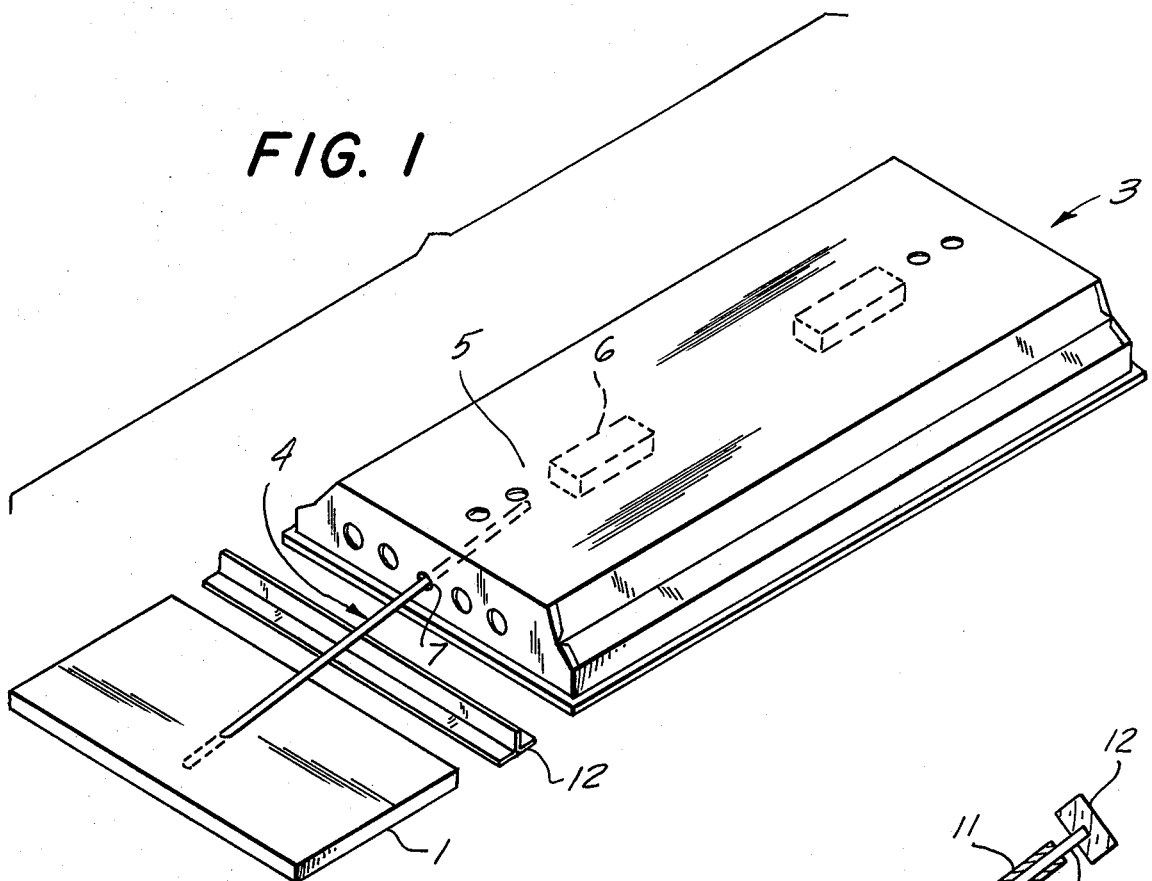
FIG. 1 is an exploded pictorial view of a recessed lighting fixture and supporting ceiling, with light pipe.

With reference now to FIG. 1, there may be seen an apparatus of the present invention. The suspended ceiling, of which one panel 1 is shown, is mounted on a framework of T-bar-like members 2, which also serve to support lighting fixture 3. Lightpipe 4, consisting of a covered acrylic rod of small diameter, extends from wiring compartment 5 through hole 7 over T-bar 2 through ceiling panel 1. Light enters end of pipe 4, from room under ceiling and strikes photocell (not shown) in fixture wiring compartment 5. Ballast 6 is energized or deenergized as the level of daylight for which the control has been calibrated demands. Hole 7 has been drilled for passage of light pipe 4 from inside of fixture 3, to avoid necessity of removing any ceiling panels.

Figure 2:
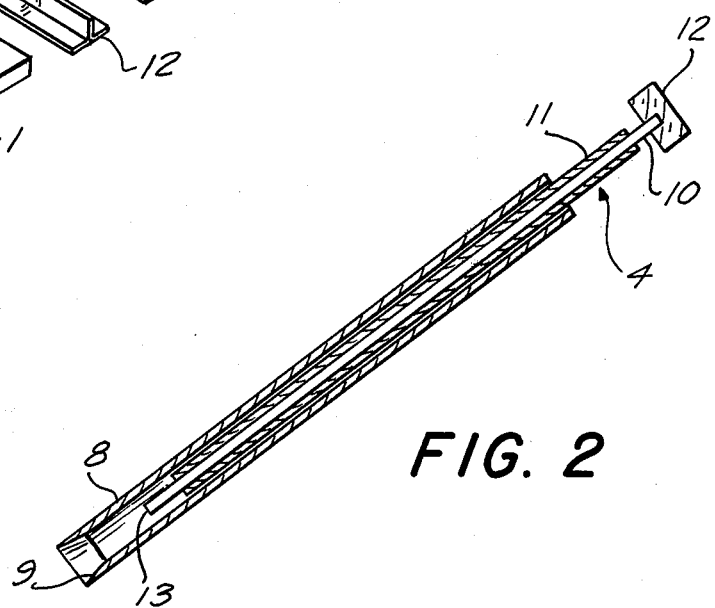
FIG. 2 is a sectional view of installing tool and light pipe or conduit.

With reference now to FIG. 2, the technique of installation is shown. A metal tube 8, somewhat larger in internal diameter than lightpipe 4, has a cutting edge 9, which can be pushed through the ceiling panel 1, usually made of soft acoustic material, from inside fixture 3 through hole 7. Lightpipe 4, consisting of acrylic rod 10, covered with light-impervious sheath 11, and terminating in acrylic light-spreading and diffusing button 12, is then inserted through tube 8 from fixture 3. Tube 8 may then be withdrawn through ceiling panel 1, removing core of ceiling material, and exposing end 13 of lightpipe 4 to room light.

Button 12 is positioned against face of photocell (not shown), in the manner shown in my patent application Ser. No. 606,745, filed on Aug. 22, 1975, for improvements in photocell controlled circuits.

The photocontrol is then wired to control ballast 6 in response to any previously calibrated daylight level. It has not been necessary to remove ceiling panel 1, or to damage it except for a one-quarter inch diameter hole through which end 13 of lightpipe 4 is exposed, and there has been no damage to fixture lens or louver.

Figure 3:
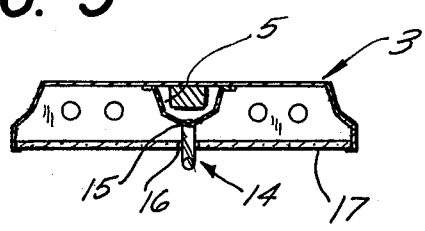
FIG. 3 is a cross-sectional view of the fixture, showing ballast compartment and light-admitting fitting.

With reference now to FIG. 3, in an alternative method, a hole may be punched in cover 15 of the ballast compartment 5, coaxially with a hole 16 in louver or lens 17, at either end of fixture 3. Lightpipe 14 is a right-angled acrylic rod, although other materials may be used, adjusted to see daylight from a nearby window.

It, therefore, may be seen that the present invention is well adapted to attain substantially all of the objects and advantages hereinabove set forth together with other advantages which will become apparent from the description of the apparatus. This description, including the alternative embodiment, is intended as illustrative of the concept of the present invention, and it is intended that other embodiments be considered as falling within the spirit and scope of the present invention.

What is claimed is:

1. Light-admitting means for recessed-troffer lighting-fixture, comprising:
    photocell-controlled relay within said lighting fixture compartment;
    cutting-edged coring tube having driving means for penetrating a ceiling;
    light-admitting conduit having light-impervious sheath of diameter smaller than inner diameter of said coring tube; and
    optical coupling means from said light-admitting conduit to said photocell-controlled relay.

* * * * *